United States Patent
Yamagiwa et al.

(10) Patent No.: US 7,559,592 B2
(45) Date of Patent: Jul. 14, 2009

(54) VEHICLE INTERIOR MEMBER AND METHOD FOR REMOVAL THEREOF

(75) Inventors: Tsuyoshi Yamagiwa, Hiroshima (JP); Shouichirou Hidaka, Hiroshima (JP); Hideaki Kikkawa, Hiroshima (JP)

(73) Assignee: Daikyo Nishikawa Corporation, Hiroshima (JP)

( * ) Notice: Subject to any disclaimer, the term of this patent is extended or adjusted under 35 U.S.C. 154(b) by 5 days.

(21) Appl. No.: 11/819,156

(22) Filed: Jun. 25, 2007

(65) Prior Publication Data

US 2008/0018128 A1 Jan. 24, 2008

(30) Foreign Application Priority Data

Jul. 19, 2006 (JP) ............................. 2006-197015

(51) Int. Cl.
*B60J 9/00* (2006.01)
(52) U.S. Cl. .................................................... 296/1.02
(58) Field of Classification Search ............... 296/1.02, 296/29, 1.08; 16/110.1; 24/289, 297
See application file for complete search history.

(56) References Cited

U.S. PATENT DOCUMENTS

| | | | |
|---|---|---|---|
| 5,662,375 A | 9/1997 | Adams et al. | |
| 6,141,837 A | 11/2000 | Wisniewski | |
| 6,786,522 B2 * | 9/2004 | Kench et al. ................... | 296/3 |
| 6,969,100 B2 * | 11/2005 | Totani et al. ............... | 296/1.02 |
| 7,234,209 B2 * | 6/2007 | Totani et al. .................. | 24/607 |
| 7,267,385 B2 * | 9/2007 | Williams et al. .............. | 296/29 |
| 7,415,751 B2 * | 8/2008 | Kato et al. ..................... | 24/289 |
| 2003/0200634 A1 | 10/2003 | Hansen | |
| 2003/0234549 A1 | 12/2003 | Totani et al. | |
| 2005/0116485 A1 * | 6/2005 | Kuroda ....................... | 296/1.08 |
| 2005/0248167 A1 | 11/2005 | Totani et al. | |
| 2007/0102944 A1 * | 5/2007 | Kato et al. ................... | 296/1.02 |
| 2008/0018128 A1 * | 1/2008 | Yamagiwa et al. ......... | 296/1.02 |
| 2008/0066266 A1 * | 3/2008 | Scroggie et al. ............... | 24/297 |

FOREIGN PATENT DOCUMENTS

| | | |
|---|---|---|
| EP | 1 277 974 | 1/2003 |
| EP | 1 353 079 | 10/2003 |
| JP | 2003 226182 | 8/2003 |
| JP | 2003-226182 | 8/2003 |
| WO | WO 01 42041 | 6/2001 |

* cited by examiner

OTHER PUBLICATIONS

European Search Report Application EP 07 01 3133 dated Jan. 15, 2008.

*Primary Examiner*—H Gutman
(74) *Attorney, Agent, or Firm*—Studebaker & Brackett PC; Donald R. Studebaker (57) ABSTRACT

To provide a vehicle interior member affixing member capable of improving the efficiency of attachment and removal operations. A vehicle interior member attached to an attaching portion in a vehicle cabin having an interior member main body and an affixing member for attaching the interior member main body, wherein the affixing member comprises two inserted portions inserted at the leading end side into an opening portion and mutually separated, a tab portion disposed on these inserted portions and engaging the edge portions of the opening portion when attached, thereby preventing the affixing member from falling out, and a connecting portion connecting the two inserted portions in such a way that the width at the base end side is approximately the same as the width at the opening portion; when the interior member main body is attached, the two inserted portions are placed at a spacing such that the tab portions engage the opening portions, and when pulled out, they are elastically deformed such that the gap at the leading end side of the inserted portions narrows and the engagement between the tab portion and the opening portion is released.

3 Claims, 6 Drawing Sheets

VEHICLE INTERIOR MEMBER AND METHOD FOR REMOVAL THEREOF

TECHNICAL FIELD OF THE PRESENT INVENTION

The present invention relates to an affixing member, a vehicle interior member equipped therewith, and a method for removal thereof, and in particular relates to an affixing member for attaching an interior portion main body to an attaching portion disposed within a vehicle cabin, a vehicle interior member furnished therewith, and a method for removal thereof.

BACKGROUND ART

An attaching structure and attaching method for an automobile interior part is set forth in Japanese Patent Laid-Open No. 2003-226182 (Patent Document 1). This document sets forth an attaching structure for an automobile interior part such as an assist grip or the like attached inside a vehicle cabin. In this attaching structure, the assist grip is attached to an automobile body panel using a clip formed from a thin metal sheet. This metal clip is formed by bending a long and narrow metal sheet such that it becomes tapered at one end; the bent clip end side is inserted into an opening provided in a body panel and the clip is attached in such a way that both ends of the metal sheet are positioned at the base end side. Moreover, a retaining tab is formed in the center portion of the clip, and when the clip is inserted to a predetermined position, this retaining tab engages with the edge of the body panel opening and the clip is prevented from falling off.

When removing an assist grip, the base end portion of the clip is grasped and caused to elastically deform such that the clip narrows, thereby releasing the engagement between the retaining tab and the body panel. Pulling the clip toward the cabin interior in this state enables the clip to be pulled out of the opening, thereby removing the assist grip affixed thereby. Furthermore, in this attaching structure a pressure plug is fitted into the base end portion of the clip; this pressure plug prevents the assist grip from falling out due to a release of engagement by the retaining tab caused by accidental elastic deformation of the clip. These features being set forth in Japanese Patent Laid-Open No. 2003-226182.

SUMMARY OF THE PRESENT INVENTION

However, the attaching structure set forth in JP2003-226182 has the problem that when a clip is elastically deformed in order to remove an assist grip, the clip can be mistakenly caused to fall down inside an opening in a body panel or a bracket affixed to a body panel. There are cases, that is, in which an operator's hands may slip, for example, when elastically deforming a clip, such that the entire clip passes through an opening in a body panel or the like and falls down. If a clip is dropped into the inside of a body panel opening it is difficult in typical vehicle structures to recover the clip, and even if dropped from an opening in a bracket, the clip can be lost, in both cases greatly degrading work efficiency.

Furthermore, in the attaching structure set forth in Japanese Patent 2003-226182, the assist grip can be more reliably affixed by a pressure plug, but there is a danger that the pressure plug will be dropped or lost when being attached or removed.

Therefore the present invention has the object of providing an affixing member, a vehicle interior member furnished therewith, and a method for removal thereof, capable of improving the work efficiency of attachment and removal.

In order to solve the above-described issues, the present invention is a vehicle interior member attached to an attaching portion disposed in a vehicle cabin having an interior member main body and an affixing member for attaching the interior member main body, wherein the affixing member comprises two inserted portions arrayed in a row so as to be mutually separated, the leading end sides of which are inserted into an opening portion; a tab portion disposed on at least one of these inserted portions, such that it engages the edge portion of the opening portion when the interior member main body is attached to the attaching portion, thereby preventing the affixing member from falling out of the opening portion; and a connecting portion connecting the two inserted portions in such a way that the width at the base end side of the affixing member is approximately the same as or greater than the width at the opening portion; when the interior member main body is attached to the attaching portion, the two inserted portions are placed at a spacing at which the tab portions engage the opening portions, and when the two inserted portions are pulled out from the opening portions, the gap at the leading end side of the two inserted portions is elastically deformed so as to become narrow, and the engagement between the tab portion and the opening portion is released.

In the present invention thus constituted, an interior member main body is attached by inserting an affixing member into an opening portion formed on an attaching portion. When the leading end side of an inserted portion of an affixing member is inserted into an opening portion, the tab portion disposed on the inserted portion engages the edge portion of the opening portion, and the affixing member is prevented from falling out. When the inserted portion is removed from the opening portion, the affixing member is elastically deformed such that the gap at the inserted portion leading end narrows, and the engagement of the tab portion and the opening portion is released.

In the present invention thus constituted, the base end side of the affixing member is connected by a connecting portion, and the width at the base end side of the affixing member is essentially the same as or greater than the width of the opening portion, therefore the affixing member can be prevented from falling into an opening portion, and the of work of attaching vehicle interior members can be made more efficient.

Moreover, in the present invention a falling out prevention means is preferably provided to prevent the gap on the leading end side of the two inserted portions from being made narrow when an interior member main body is in a state of attachment to an attaching portion.

In the present invention thus constituted, the gap at the leading end side of the inserted portions is maintained by a falling out prevention means, thus enabling the affixing member to be more reliably prevented from falling.

In the present invention the falling out prevention means preferably has two spacer members disposed between two inserted portions and extending on both sides of a connecting portion, and a spacer joining portion which joins these spacer members at the leading end side relative to the connecting portion.

In the present invention thus constituted, the two spacer members of the falling out prevention means extend on both sides of the affixing member connecting portion, and these spacer members are joined at the leading end side relative to the affixing member connecting portion, therefore the falling out prevention means can prevent falling to the base end side.

Moreover, the affixing member can be more reliably prevented from falling into the opening portion.

In addition, the present invention preferably has a falling out prevention means for preventing the dropping-out of the affixing member; this falling out prevention means comprises two spacer members disposed between the two inserted portions and extending on both sides of a connecting portion, and a spacer joining portion for joining the two spacers at the leading end side relative to the affixing member connecting portion; when the interior member main body is attached to an attaching portion, the two inserted portions are placed at a spacing such that the tab portions engage the opening portions, and by moving the two spacer members to the base end side it becomes possible to elastically deform the affixing member such that the gap at the leading end side of the two inserted portions narrows, thus enabling the engagement between the tab portions and the opening portions to be released.

In the present invention thus constituted, the falling out prevention means spacer member is joined at the leading end side relative to the affixing member connecting portion, thereby enabling the affixing member to be reliably prevented from falling into the opening portion.

In the present invention the two spacer members preferably extend from the inserted portion base end side up to the vicinity of the tab portion.

In the present invention thus constituted, the spacer members extend to the vicinity of the tab portion, therefore the inserted portion gap in the tab portion vicinity can be maintained at a predetermined distance, and engagement between the tab portion and the opening portion can be reliably maintained.

In the present invention, angled portions bent in a mutually approaching direction are preferably provided at the leading ends of the two inserted portions; these angled portions are formed such that the ends thereof do not interfere with one another even when the gap between the two inserted portions is narrowed.

In the present invention thus constituted, the leading end of the affixing member is tapered due to the angled portion thereof, thus allowing for easy insertion of the affixing member leading end into the opening portion. The angled portion is also formed such that the ends do not interfere with one another even when the inserted portion gap is narrowed, therefore the elastically deformable distance can be enlarged when the inserted portion gap is narrowed. This allows the distance at which the tab portion and the opening portion engage to be lengthened.

In the present invention the interior member main body preferably has a main body connecting portion; an inserted portion connecting portion connecting an interior member main body to an affixing member by engagement with a main body connecting portion is formed on the inserted portions, and when the gap between the two inserted portions is narrowed, the engagement between the main body connecting portion and the inserted portion connecting portion is released.

In the present invention thus constituted, the interior member main body and the affixing member are connected by the engagement of the main body connecting portion and the inserted portion connecting portion, therefore those parts can be reliably connected using a simple structure. Also, the engagement between the main body connecting portion and the inserted portion connecting portion is released by narrowing the gap at the inserted portions, thus enabling simple assembly and removal of an interior member main body and an affixing member.

In the present invention the interior member main body is preferably attached to an attaching portion so that roof trim disposed to cover vehicle-mounted air bag is disposed between the attaching portion and the interior member main body, and the tab portion extends at an angle from the leading end side to the base end side of the inserted portions; the end thereof is formed to engage the edge portion of the opening portion, and when a strong force is applied by the deployment of the airbag, the tab portion is bent, the interior member main body is displaced toward the base end side, and displacement to the base end side by the roof trim is permitted.

In the present invention thus constituted, application of a strong force by deployment of the airbag causes the tab portion extending at an angle from the leading end side to the base end side of the inserted portions to be bent and the interior member main body to be displaced toward the base end side, thereby permitting displacement of the roof trim disposed therebelow. Interference with airbag deployment caused by roof trim disposed under the interior member main body can thus be prevented. Moreover, the distance at which the tab portion and the opening portion engage is lengthened due to the bending of the tab portion, thus enabling the interior member main body to be reliably prevented from falling out as a result of airbag deployment.

The present invention is an affixing member for attaching an interior member main body to an attaching portion disposed within a vehicle cabin, comprising two inserted portions disposed in a row so as to be divided from one another, the leading end sides of which are inserted into an opening portion on the attaching portion; a tab portion disposed on at least one of these inserted portions and engaging the edge of the opening portion when the interior member main body is attached to the attaching portion, thereby preventing the affixing member from falling out of the opening portion; and a connecting portion connecting the two inserted portions so that the width at the base end side of the affixing member is either essentially the same as or larger than the width of the opening portion; whereby when the interior member main body is attached to the attaching portion, the two inserted portions are spaced such that the tab portion engages the opening portion, and when the two inserted portions are pulled out from the opening portion, there is an elastic deformation such that the gap narrows between the leading end sides of the two inserted portions, and the engagement between the tab portion and the opening portion is removed.

The present invention is a method for removing an interior member main body affixed by an affixing member to an attaching portion disposed within a vehicle cabin, wherein the affixing member comprises two inserted portions disposed in a row so as to be divided from one another, the leading end sides of which are inserted into an opening portion on the attaching portion, a tab portion disposed on these inserted portions and engaging the edge of the opening portion, and a connecting portion connecting the two inserted portions so that the width at the base end side of the affixing member is either essentially the same as or larger than the width at the opening portion, the invention having a step in which the separation gap between the inserted portions is narrowed by elastically deforming the affixing member to remove the engagement of the tab portion with the opening portion, and a step in which the affixing member is pulled out from the base end side with the tab portion engagement in a released state.

Furthermore, the present invention preferably has a step for preparing a falling out prevention means, comprising two spacer members arranged so as to extend on both sides of the connecting portion, holding the separation gap between the separation portions, and a spacer joining portion which joins the two spacer members at the leading end side relative to the connecting portion; and a step for causing the falling out prevention means to move to the base end side.

Therefore the work efficiency of attachment and removal can be improved by the affixing member, the vehicle interior member furnished therewith, and the method for their attachment and removal of the present invention.

PREFERRED EMBODIMENT OF THE PRESENT INVENTION

Next, referring to the attached diagrams, we shall explain a vehicle interior member according to a preferred embodiment of the present invention. We here explain the case in which the present invention is applied to an assist grip, which is one type of vehicle interior member.

Figure 1:
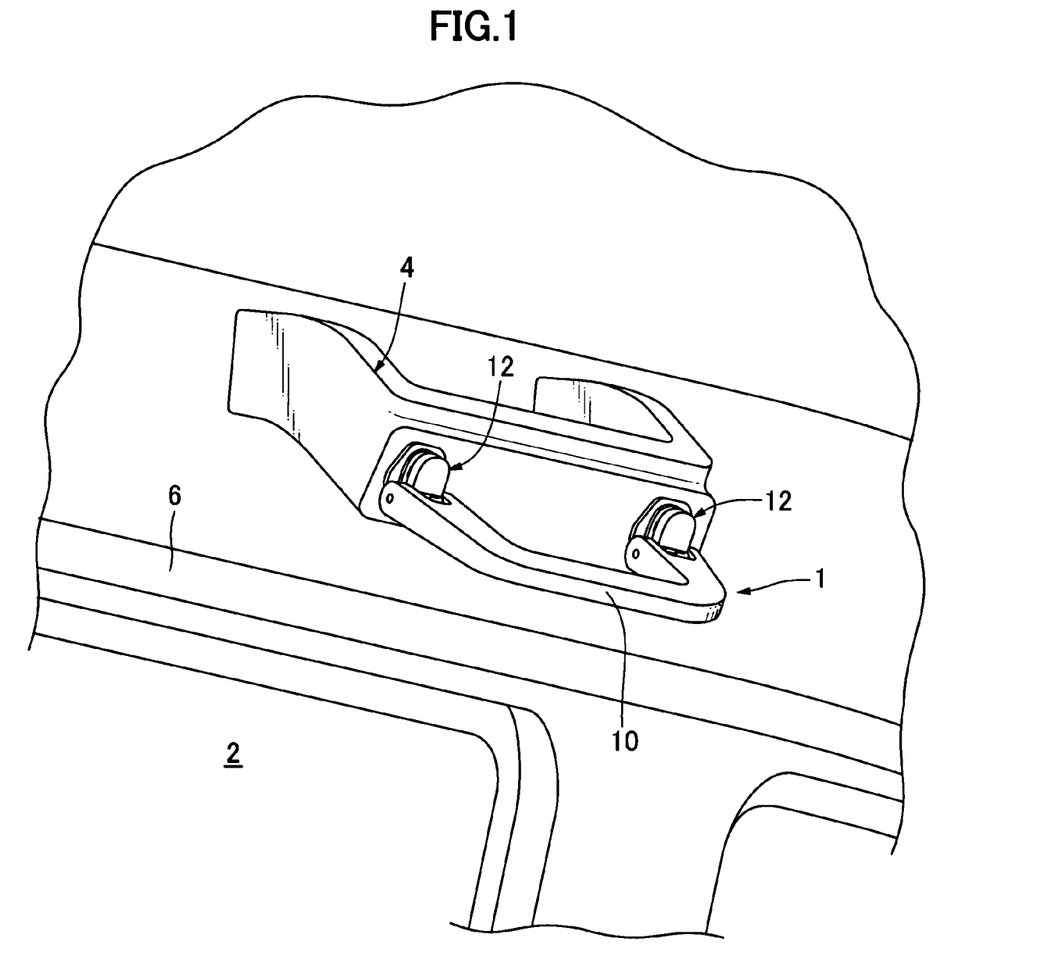
FIG. 1 is a perspective view showing an assist grip according to an embodiment of the present invention attached to the upper side surface of a vehicle cabin interior with interior materials such as the roof trim removed.
Figure 2:
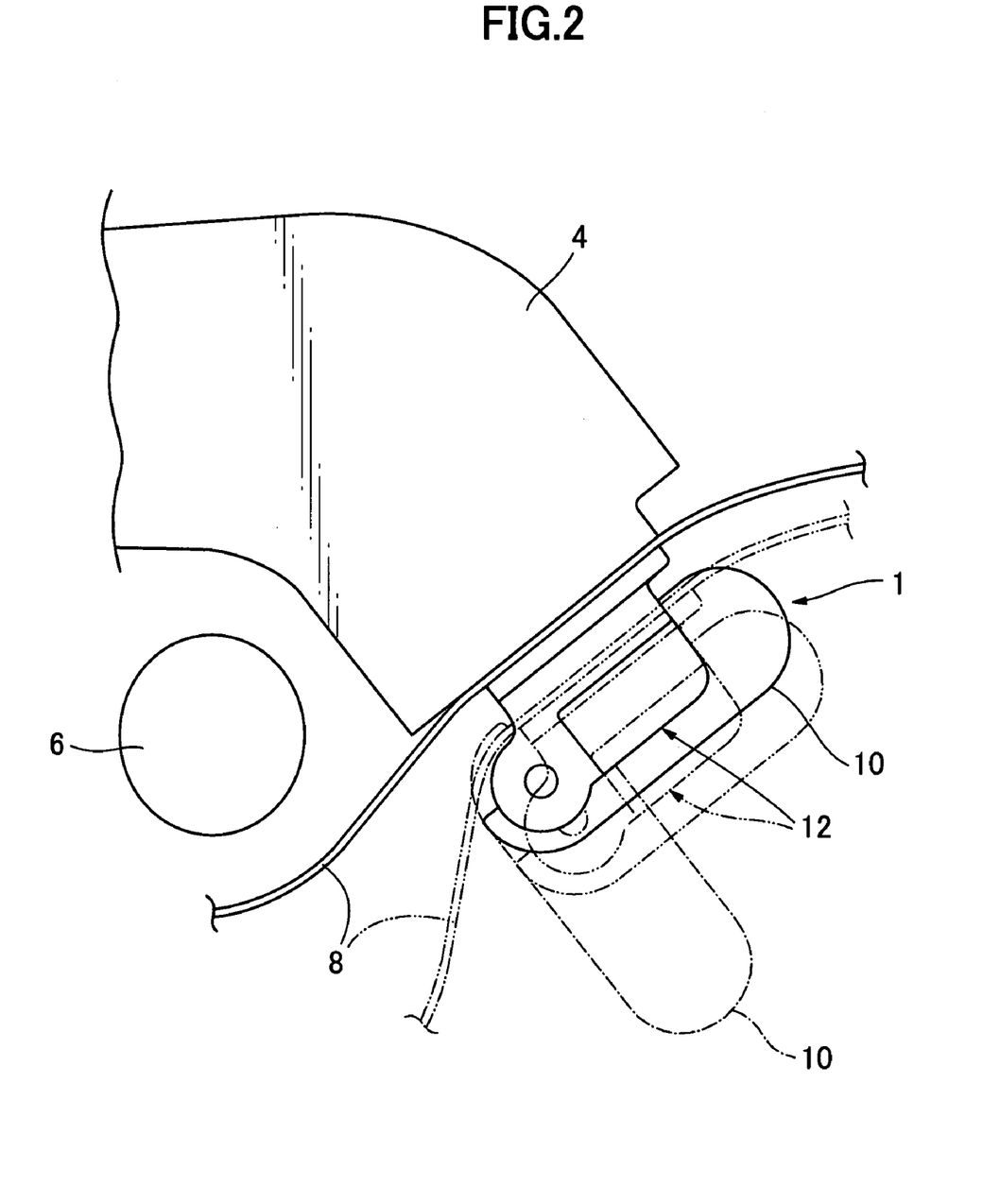
FIG. 2 is a side view of an assist grip according to an embodiment of the present invention attached to a bracket, as seen from the front of the vehicle.

FIG. 1 is a perspective view showing the appearance of an assist grip according to an embodiment of the present invention attached to the upper portion of a side surface inside a vehicle cabin. FIG. 2 is a side view of the appearance as seen from the front of a vehicle showing an assist grip according to an embodiment of the present invention, attached to a bracket.

As shown in FIGS. 1 and 2, an assist grip 1 according to the present embodiment is attached above a window 2 on the vehicle side wall to the vehicle body through a bracket 4, which is an attaching portion. A curtain airbag 6 is disposed close to and under the bracket 4. Moreover, roof trim 8 (FIG. 2) is attached so as to cover the bracket 4 and the curtain airbag 6, and the assist grip 1 is attached so as to sandwich the roof trim 8 between it and the bracket 4.

Figure 3:
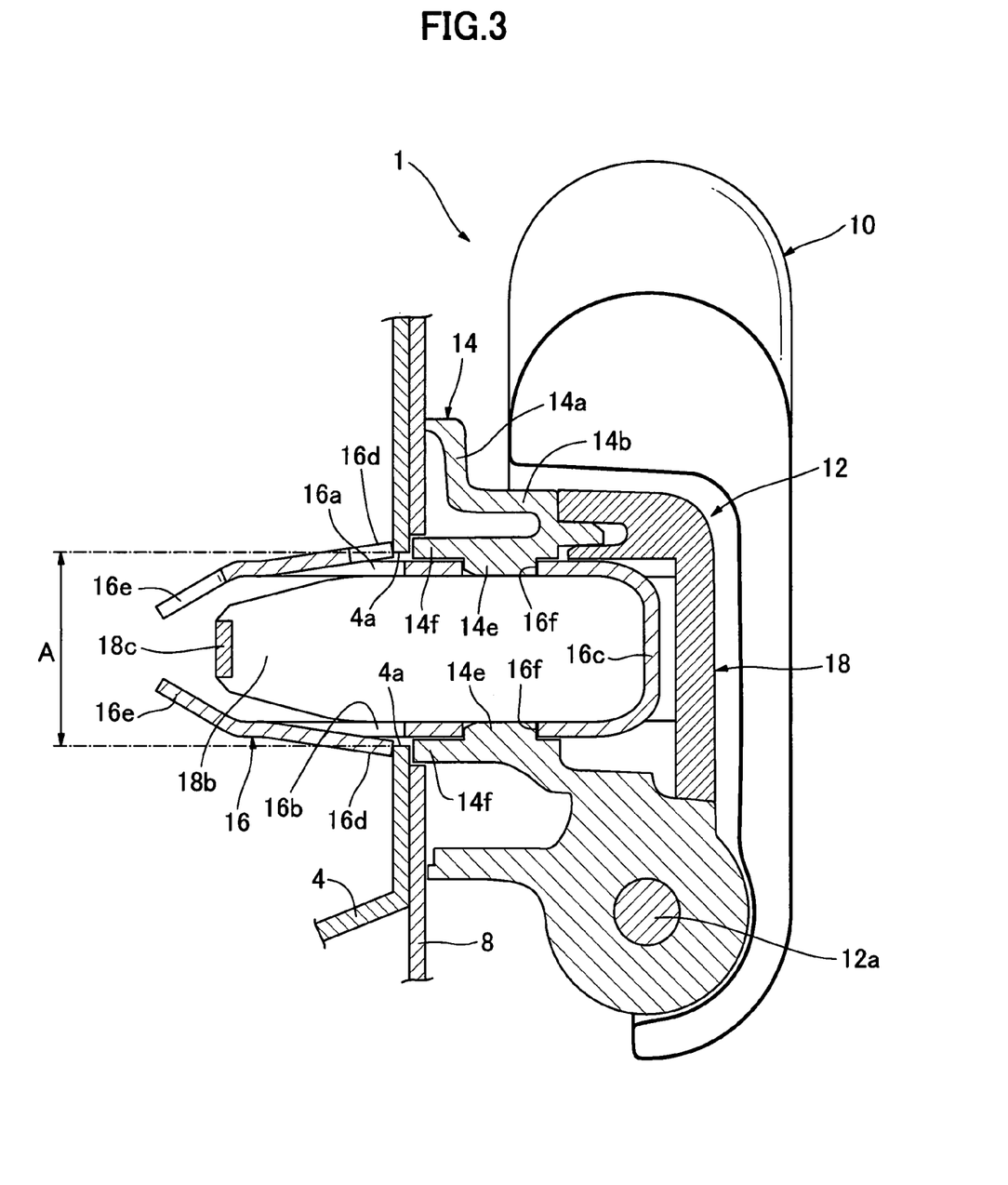
FIG. 3 is a side sectional view of an assist grip according to an embodiment of the present invention affixed to a bracket.
Figure 4:
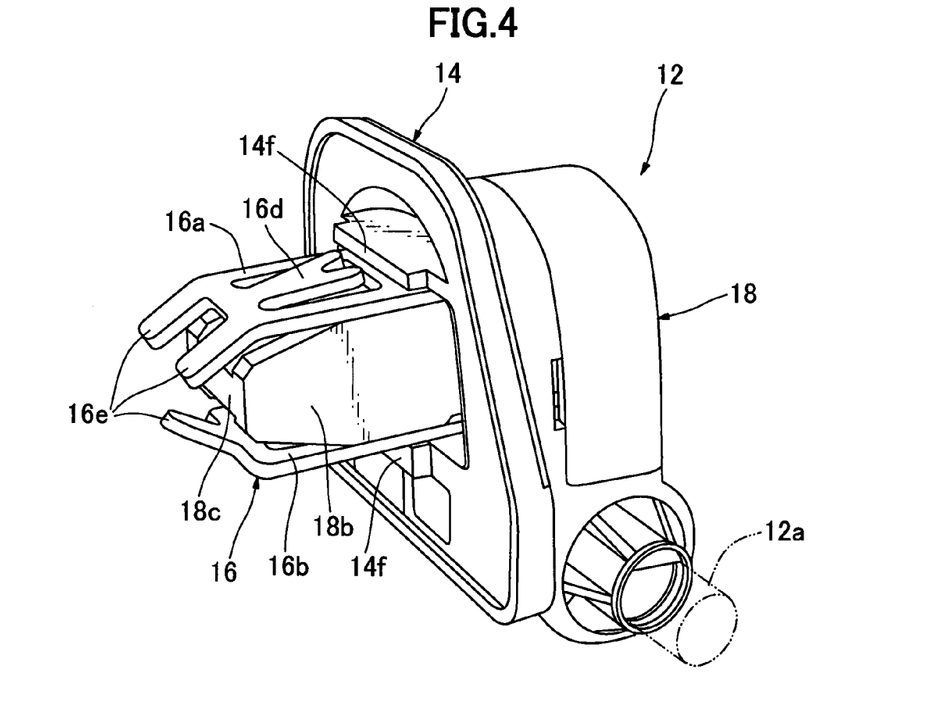
FIG. 4 is a perspective view showing one of the assist grip hinge portions.

Next, referring to FIGS. 1 through 4, we shall explain the basic structure of an assist grip 1 according to the present embodiment. FIG. 3 is a side section view showing the appearance of the assist grip 1 according to the present embodiment affixed to a bracket. FIG. 4 is a perspective view showing one of the hinge portions of the assist grip 1.

As shown in FIGS. 1 and 2, the assist grip 1 according to the present invention comprises a holding portion 10 formed in a roughly "U" shape, and two hinge portions 12 rotatably supporting both end portions of this holding portion 10. When not in use, the assist grip 1 is in the state depicted by the solid line in FIG. 2; when in use, it is constituted as depicted by the imaginary line in FIG. 2, such that the holding portion 10 is rotated approximately 90° about a shaft 12a attached to the bottom of the hinge portion 12.

As shown in FIGS. 3 and 4, the hinge portion 12 has a hinge main body 14 on which a bearing for receiving a shaft 12a is disposed, a clip 16, being an affixing member for attaching the bracket 4, and a cap 18 attached to the hinge main body 14 so as to cover this clip 16. Note that in the present embodiment, the holding portion 10, the hinge main body 14, and the cap 18 correspond to the interior member main body. As shown in FIG. 3, on each of the hinges 12 the leading end side of the clip 16 which protrudes from the hinge portion 12 outside the vehicle is inserted into one of the openings 4a disposed on the brackets 4, and is affixed to the bracket by engaging with the edge portion of the opening portion 4a.

Figure 5:
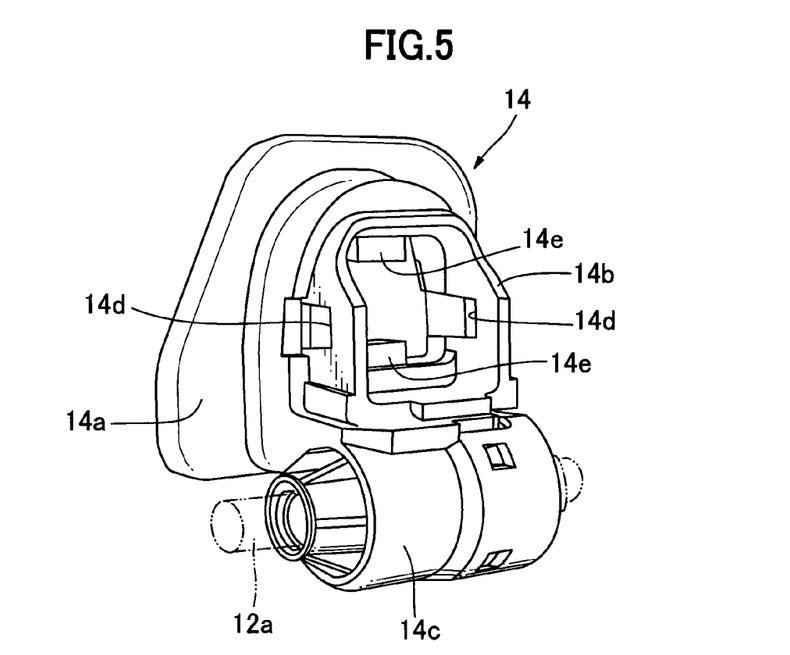
FIG. 5 is a perspective view of a hinge main body seen from the vehicle cabin interior side.
Figure 6:
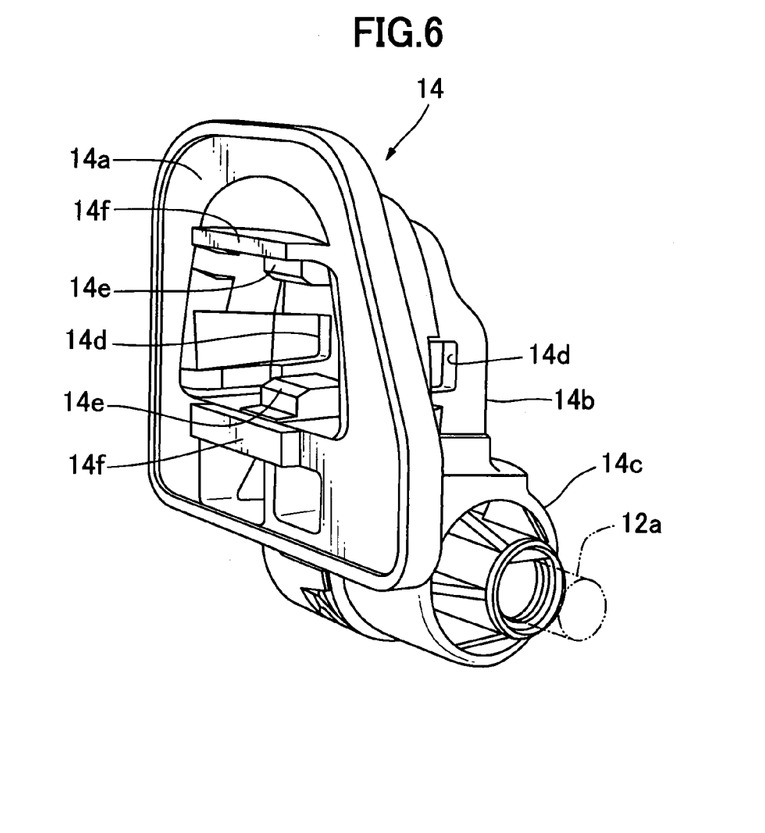
FIG. 6 is a perspective view of a hinge main body seen from outside the vehicle cabin.
Figure 7:
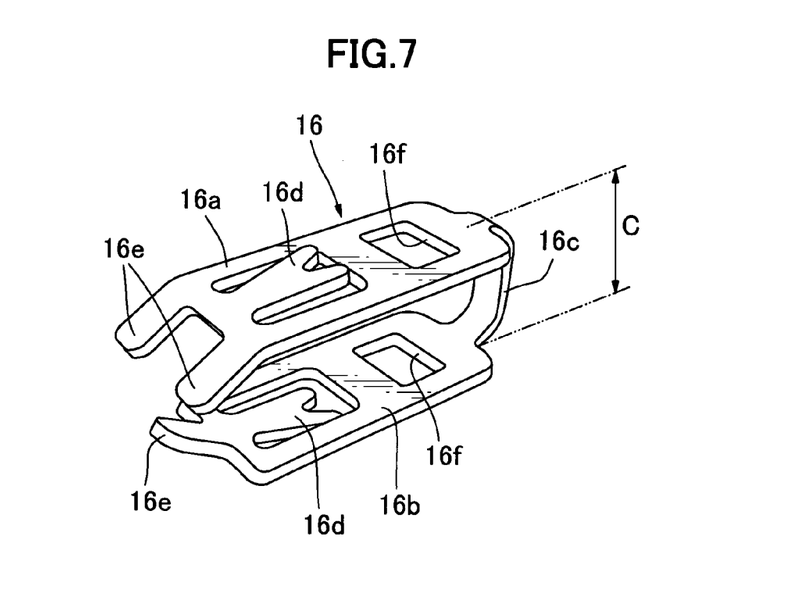
FIG. 7 is a perspective view of a clip.
Figure 8:
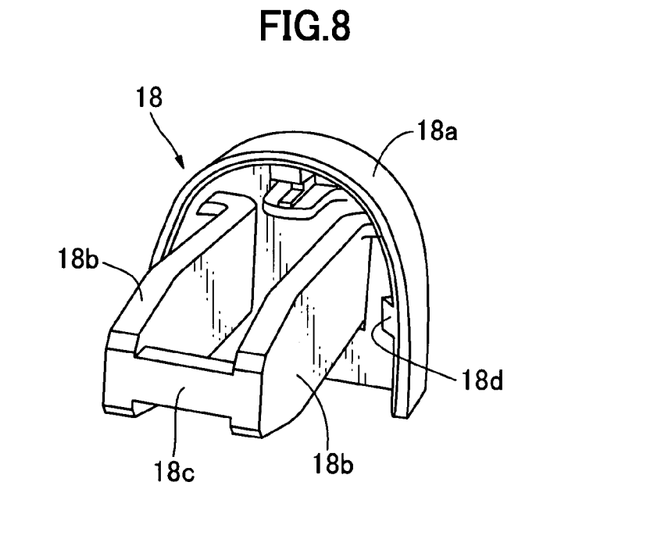
FIG. 8 is a perspective view of a cap.

Next, referring to FIGS. 5 through 8, we shall explain each of the parts constituting the hinge portion 12. FIG. 5 is a perspective view of the hinge main body 14 as seen from the vehicle interior. FIG. 6 is a perspective view of the hinge main body 14 as seen from the vehicle exterior. FIG. 7 is a perspective view of the clip 16. FIG. 8 is a perspective view of the cap 18.

As shown in FIGS. 5 and 6, the hinge main body 14 has a roughly trapezoidal plate-shaped base portion 14a, a tubular portion 14b arranged to receive the clip 16, formed at approximately the center of the base portion 14a, and a columnar bearing portion 14c which is formed below the tubular portion 14b and receives a shaft 12a. Rectangular holes 14d for receiving fitting bosses 18d (FIG. 8) disposed on the cap 18 are formed on both side surfaces of the tubular portion 14b. Furthermore, roughly parallelepiped engaging protuberances 14e, which serve as main body connecting portions, are formed on the inside, top, and bottom surfaces of the tubular portion 14b. Parallelepiped raised portions 14f are formed at the top and bottom sides of the tubular portion 14b on the reverse side of the base portion 14a in order to hold the roof trim 8 against the bracket 4.

As shown in FIG. 7, the clip 16 as a whole constituted is from an elastically deformable long and narrow metal plate bent into roughly a U-shape. That is, the clip 16 has two inserted portions 16a and 16b, disposed approximately in parallel and mutually separated, with the leading end sides thereof inserted into the opening portions 4a of the bracket 4, and of a connecting portion 16c which connects the base ends of the these inserted portions 16a and 16b. The connecting portion 16c connects the inserted portions in such a way that the inserted portions 16a and 16b are disposed roughly in parallel, and the distance between the top surface of the inserted portion 16a and the bottom surface of the inserted portion 16b is approximately equal to the width A in the vertical direction of the bracket 4 opening portion 4a.

There are also tab portions 16d respectively furnished on the inserted portions 16a and 16b; these tab portions 16d are formed by cutting out a portion of each of the inserted portions 16a and 16b. The tab portions 16d are bent in such a way as to spread outward at an angle from the clip 16 from the inserted portion leading end side toward the base end side. Therefore as shown in FIG. 3, when the clip 16 is inserted into the opening portion 4a, the leading ends of each of the tab portions 16d engage the edge portion of the opening portions 4a, and the bracket 4 is prevented from dropping out.

Furthermore, angled portions 16e, bent in a mutually approaching direction, i.e. toward the inside of the clip 16, are formed at the leading ends of the inserted portions 16a and 16b. Two angled portions 16e are formed at the leading ends of the inserted portion 16a, whereas one angled portion 16e is formed at the leading end of the inserted portion 16b. The two angled portions 16e formed on the inserted portion 16a are formed at both edges in the width direction of the leading end of the inserted portion 16a, and the one angled portion 16e formed on the inserted portion 16b is formed at the center in the width direction of the leading end of the inserted portion 16b. Therefore even when elastically deformed such that the clip 16 leading end side is narrowed, the single angled portion 16e at the leading end of the inserted portion 16b penetrates between the two angled portions 16e at the leading end of the inserted portion 16a, such that there is no impeding of the elastic deformation of the clip 16 due to interference between the angled portions.

Rectangular protuberance receiving holes 16f, which are inserted portion connecting portions for receiving engaging protuberances 14e formed on the hinge main body 14, are respectively formed at the base end portions of the inserted portions 16a and 16b. When the clip 16 is inserted into the hinge main body 14 tubular portion 14b with the clip 16 in an elastically deformed state, and the clip 16 is then returned to its original shape at a predetermined position, the hinge main body 14 engaging protuberances 14e are received into the protuberance receiving holes 16f on the clip 16, and the clip 16 is joined with the hinge main body 14.

As shown in FIG. 8, the cap 18 has a cover portion 18a covering the hinge main body 14 tubular portion 14b, two spacer members 18b extending in parallel from this cover portion 18a away from the vehicle cabin, and a spacer connecting portion 18c connecting the leading ends of these spacer members 18b to one another. Fitting bosses 18d received by the hinge main body 14 rectangular holes 14d are formed on the inner side of both side walls of the cover portion 18a. This cap 18 functions as a falling out prevention means to prevent a narrowing of the gap at the leading end side of the inserted portions.

A cover portion 18a is formed in a cup shape roughly semicircular in section, and is constituted to cover the tubular portion 14b of the hinge main body 14. When the cap 18 is attached at a predetermined position on the hinge main body 14, the two fitting bosses 18d formed on the inner side on both sides of the cover portion 18a are respectively received by the rectangular holes 14d formed on both side surfaces of the tubular portion 14b, and the cap 18 is fixed with respect to the hinge main body 14.

The two spacer members 18b are roughly rectangular plate-shaped members formed so as to taper toward the leading ends, arranged in mutual parallel and the plate surfaces thereof extend in a roughly vertical direction. As shown in FIG. 4, when the hinge portion 12 is in an assembled state, the spacer members 18b are arrayed between the inserted portions 16a and 16b, and narrowing of the gap between the inserted portions 16a and 16b is prevented. Release of the engagement between the tab portions 16d of the clip 16 and the edge portion of the opening portions 4a is thus prevented. Moreover, when the hinge portion 12 is in an assembled state, the clip 16 connecting portion 16c is positioned between the two spacer members 18b. In other words, the two spacer members 18b are positioned so as to extend on both sides of the connecting portion 16c.

The spacer connecting portion 18c is formed to mutually connect the tapered leading ends of the two spacer members 18b. Therefore the cover portion 18a, the two spacer members 18b, and the spacer connecting portion 18c form a continuous member when the cap 18 is viewed from above. Furthermore, the clip 16 connecting portion 16c passes through the interior of this continuous member, the respective inserted portions 16a and 16b are connected to the top and bottom of this connecting portion 16c, and the inserted portions 16a and 16b extend along the upper edge surface and the lower edge surface of the two spacer members 18b.

Next, referring to FIGS. 1 through 8, we shall explain the procedures according to an embodiment of the present invention for assembly and removal of the assist grip 1.

In the assembly procedure, the clip 16 is first assembled to the cap 18. That is, the inserted portion 16b of the clip 16 is inserted into the continuous member formed by the cover portion 18a, the two spacer members 18b, and the spacer connecting portion 18c. Next, the clip 16 is turned such that the clip 16 connecting portion 16c contacts the inside surface of the cap 18 cover portion 18a, and the clip 16 is attached to the cap 18. The cap 18 spacer members 18b are by this means disposed between the inserted portions 16a and 16b.

The unit in which the clip 16 is assembled to the cap 18 is next assembled onto the hinge main body 14. That is, the leading end side of the assembled clip 16 is inserted into the tubular portion 14b of the hinge main body 14. At this point, the distance between the leading ends of the tab portion 16d formed at the inserted portions 16a and 16b is longer than the width of the tubular portion 14b in the vertical direction, therefore the tab portion 16d passes through the tubular portion 14b while being elastically deformed. When the tab portion 16d passes through the tubular portion 14b, it again returns to its original shape, and the leading ends of the tab portions 16d protrude away from the inserted portions 16a and 16b. When the clip 16 is inserted into the tubular portion 14b up to a predetermined position, the engaging protuberances 14e disposed on the inner wall of the tubular portion 14b are received by the protuberance receiving holes 16f. When the cap 18 is assembled at a predetermined position on the hinge main body 14, the fitting bosses 18d disposed on the inner wall surfaces of the cover portion 18a are received by the rectangular holes 14d disposed on the side surfaces of the tubular portion 14b. Thus, as shown in FIG. 4, the hinge main body 14, the clip 16, and the cap 18 are integrally joined to form a hinge portion 12.

Next we shall explain the procedure for attaching the hinge portion 12 to a bracket 4 disposed inside the vehicle cabin. As shown in FIGS. 1 and 2, the bracket 4, the curtain airbag 6, and the like are attached on the upper side surface of the cabin interior, and the roof trim 8 is attached so as to cover these. As shown in FIG. 3, positions corresponding to the roof trim 8 opening portions 4a are cut away, and the two opening portions 4a are respectively exposed even after the bracket 4 is covered by the roof trim 8. By inserting the clip 16 of the hinge portion 12 in the assembled state shown in FIG. 4 into these exposed opening portions 4a, the hinge portion 12 is affixed to the bracket 4. Since at this point the distance between the leading ends of the tab portions 16d formed on the inserted portions 16a and 16b is longer than the width of the opening portions 4a in the vertical direction, the tab portions 16d pass through the opening portions 4a only by being elastically deformed. When the tab portions 16d pass through the opening portions 4a, they again return to their original state, and the leading ends of the tab portions 16d protrude outward of the inserted portions 16a and 16b.

As shown in FIG. 3, the leading ends of the tab portions 16d engage the edge portions of the opening portions 4a on the reverse side of the bracket 4 by protruding outward, thereby affixing the clip 16 to the bracket 4. At the same time, the raised portion 14f formed on the hinge main body 14 contacts the edge portion on the front side of the bracket 4. This causes the bracket 4 to be sandwiched between the leading ends of the clip 16 tab portions 16d and the raised portions 14f of the hinge main body 14, such that the hinge portion 12 is affixed to the bracket 4. The roof trim 8 covering the bracket 4 is sandwiched between the brackets 4 and the hinge main body 14, and the roof trim 8 is held down by the outer perimeter portion of the base portion 14a.

Similarly, the attachment of the assist grip 1 is completed by attaching the holding portion 10 between the two hinge portions 12 after an additional hinge portion 12 is affixed to the bracket 4.

Next we shall explain the procedure according to the present embodiment for removing the assist grip 1.

When removing an assist grip 1, the holding portion 10 is first rotated downward approximately 90° to expose the cap 18 of the hinge portion 12. Next, the engagement of the fitting bosses 18d is released while slightly elastically deforming the cap 18, and the cap 18 is moved to the base end side of the clip 16. Here the connecting portion 16c extends in the vertical direction on the base end portion of the clip 16, the leading end side of which is inserted into the bracket 4, and the leading ends of the two spacer members 18b extending on both sides of this connecting portion 16c toward the leading end side of the clip 16 are connected in a horizontal direction by the spacer joining portion 18c. Therefore even if the cap 18 were pulled out from the hinge main body 14 to the base edge side, the cap 18 would continue to be engaged with the clip 16, and the cap 18 would not fall out into the vehicle cabin.

The spacer members 18b disposed between the inserted portions 16a and 16b are removed by pulling out the cap 18, exposing the clip 16 base end portion. This makes it possible to press on the inserted portions 16a and 16b to narrow the gap between the inserted portions 16a and 16b, thereby enabling the release of engagement of the tab portions 16d engaged by the edge portion of the opening portions 4a. Even in this state, the engagement between the hinge main body 14 engaging protuberances 14e and the clip 16 protuberance receiving holes 16f is maintained, so the hinge main body 14 will not separate from the clip 16. Therefore by pulling out the clip 16 from the opening portions 4a, the hinge main body 14 will also be removed from the bracket 4 along with the clip 16. Furthermore, the width C in the vertical direction on the base end side of the clip 16 is formed to be approximately the same as the width A of the opening portions 4a in the vertical direction, therefore the clip 16 does not drop off on the leading end side and fall into the opening portions 4a.

We shall next explain the action of the assist grip 1 in cases where there is a deployment of the curtain airbag 6 disposed in proximity to the assist grip 1.

As shown in FIGS. 1 and 2, when there is a deployment of the curtain airbag 6 disposed below and in proximity to the bracket 4 and covered by the roof trim 8, the roof trim 8 is dislodged downward as indicated by the imaginary lines in FIG. 2. As a result of this movement of the roof trim 8, the assist grip 1 hinge portion 12 also receives a force from the bracket 4 in the pulling out direction. When a strong force of this type operates on the hinge portion 12, a large force also operates on the tab portions 16d of the clip 16 which had been engaged by the edge portion of the opening portions 4a. This force causes the tab portions 16d to bend until they are essentially perpendicular to the inserted portions 16a and 16b. Thus, as shown by the imaginary lines in FIG. 2, the entirety of the hinge portion 12 is moved toward the base end side of the clip 16, and downward movement of the roof trim 8 which had been sandwiched between the hinge portion 12 and the bracket 4 is also allowed. The deployment of the curtain airbag 6 is thus not impeded by an assist grip 1 attached in proximity thereto. At the same time, while the hinge portion 12 is moved toward the base end side of the clip 16, the clip 16 tab portions 16d remain engaged with the opening portions 4a, so the hinge portion 12 will not drop out of the bracket 4.

In the assist grip embodiment of the present invention, the clip base end side is connected by a connecting portion, and the width in the vertical direction at the base end side of the clip is constituted to be essentially the same as the width in the vertical direction of the opening portion, therefore the clip can be prevented from falling into the opening portion. This enables the efficiency of the assist grip attachment operation to be improved.

In the present assist grip embodiment, the gap at the leading end side of the inserted portion is held by the spacer members disposed on the cap, thereby more reliably preventing the clip from dropping off.

Moreover, in the assist grip of the present embodiment two spacer members extend on both sides of the clip connecting portion, and these spacer members are joined at the leading end side relative to the connecting portion, therefore the cap can be prevented from falling on the base end side. The clip can also be more reliably prevented from falling into the opening portion.

Furthermore, in the assist grip of the present embodiment the spacer members extend up to the vicinity of the tab portion, therefore the gap in the region of the tab portions of the inserted portion can be maintained at a predetermined distance, and the engagement between the tab portion and the opening portion can be more reliably maintained.

Moreover, in the assist grip of the present embodiment there are angled portions bent in a mutually approaching direction disposed respectively at the leading ends of each inserted portion, therefore the clip leading ends are tapered and can be easily inserted into the opening portions. Each of the angled portions is also formed such that the leading ends do not interfere with one another even when the inserted portion gap is narrowed, therefore the distance, which can be elastically deformed by narrowing the inserted portion gap, can be increased. This allows the distance at which the tab portion and the edge portion of the opening portion engage to be increased.

With the assist grip of the present embodiment the clip and the hinge main body are connected by the engagement of the engaging protuberance on the hinge main body with the clip protuberance receiving holes, therefore these parts can be reliably connected using a simple structure. By narrowing the gap on the inserted portion, the engaging protuberance can be pulled out of the protuberance receiving hole, thus enabling the hinge main body and the clip to be easily attached and removed.

Moreover, with the assist grip of the present invention deployment of the airbag causes the tab portion on the inserted portion to be bent so that the hinge main body is displaced toward the base end side, therefore displacement of the roof trim disposed therebelow is permitted. This enables the prevention of interference with airbag deployment by the assist grip disposed over the roof trim. Furthermore, the lengthened distance at which the tab portion and the opening portion engage allows the assist grip to be reliably prevented from dropping off as a result of airbag deployment.

We have explained above a preferred embodiment of the present invention, but various modifications to the above described embodiment can be added. In particular, in the above-described embodiment the present invention was applied to a vehicle interior member assist grip, but the present invention could also be applied to other freely selected vehicle interior members such as ventilation device air blower openings or the like.

In the above-described embodiment, tabs were disposed on both of the two inserted portions of the clip, but a single tab is also acceptable. Moreover, in the above-described embodiment a cap spacer member was inserted between the clip inserted portions to hold the inserted portion gap as a means of preventing the falling out, but the falling out prevention means could also be omitted.

In the embodiment described above, narrowing of the inserted portion gap on the clip first causes the engagement between the bracket opening portion and the tab portion to separate; further narrowing of the inserted portion gap causes the engagement between the hinge main body engaging protuberance and the clip protuberance receiving hole to separate, but the engagement between the engaging protuberance and the protuberance receiving hole could also be arranged to separate first. Such a constitution would allow the hinge main body alone to be removed from the bracket, leaving the clip on the bracket.

Or, by narrowing the gap at the clip inserted portion, a constitution could also be adopted whereby the engagement of the bracket opening portion with the tab portion and the engagement of the engaging protuberance with the protuberance receiving hole both separate at essentially the same time. In such a constitution it would be possible to remove only the clip, leaving the hinge main body as is on the bracket.

Figure 9:
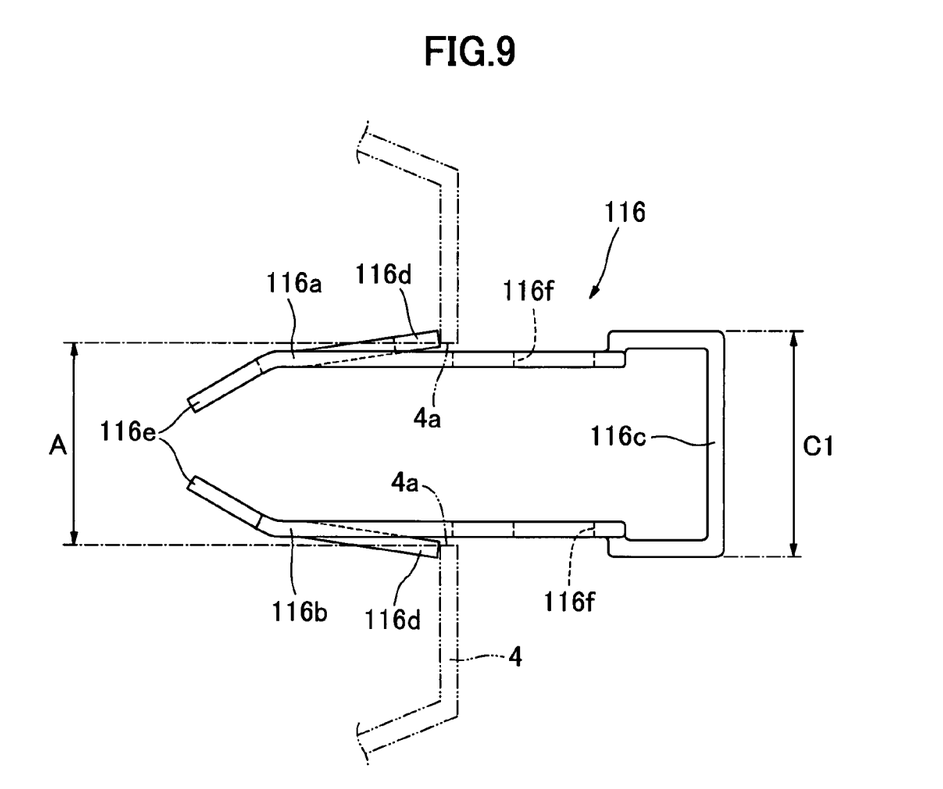
FIG. 9 is a side view of a clip according to a variation.

Moreover, in the above-described embodiment the width in the vertical direction of the clip base end side was formed to be essentially the same as the width of the opening portion in the vertical direction, but the width at the clip base end side could also be formed to be even larger. FIG. 9 shows an example of a clip according to such a variation. A clip 116 according to this variation has inserted portions 116a and 116b disposed approximately in parallel, angled portions 116e formed at the leading end of each inserted portion, and tabs 116d formed in the middle of each inserted portion. Moreover, the inserted portions 116a and 116b are mutually connected by a connecting portion 116c disposed on the base end side. The connecting portion 116c is formed to have an expanding width, and the width C1 in the vertical direction on the clip base end side is larger than the width A in the vertical direction of the bracket 4 opening portion.

The invention claimed is:

1. A vehicle interior member attached to an attaching portion disposed in a vehicle cabin comprising:
an interior member main body and
an affixing member for attaching the interior member main body to the attaching portion by insertion thereof into an opening portion formed on the attaching portion,
wherein the affixing member has:
two inserted portions arranged so as to be mutually separated, leading end sides of which are inserted into the opening portion;
a tab portion disposed on at least one of the inserted portions, so as to engage an edge portion of the opening portion when the interior member main body is attached to the attaching portion, thereby preventing the affixing member from falling out of the opening portion; and
a connecting portion connecting the two inserted portions in such a way that a width at a base end side of the affixing member is approximately the same as or greater than a width at the opening portion;
wherein the vehicle interior member is constituted in such a way that when the interior member main body is attached to the attaching portion, the two inserted portions are placed at a spacing such that the tab portion engages the opening portion, and when the two inserted portions are pulled out from the opening portion, a gap at the leading end sides of the two inserted portions is elastically deformed to become narrow, and the engagement between the tab portion and the opening portion is released;
the vehicle interior member further comprising a falling out prevention portion which prevents the dropping-out of the affixing member, whereby the falling out prevention portion has two spacer members arranged between the two inserted portions and extending on both sides of the connecting portion, and a spacer connecting portion for connecting the two spacer members at a leading end side relative to the connecting portion, such that when the interior member main body is attached to the attaching portion, the two inserted portions are placed at a spacing whereby the tab portion engages the opening portion, and by moving the two spacer members to a base end side, the affixing member elastically deforms the affixing member such that a gap on the leading end side of the two inserted portions narrows, thus enabling a release of the engagement between the tab portion and the opening portion; and
wherein the two spacer members extend from the base end side of the inserted portion up to a vicinity of the tab portion.

2. A vehicle interior member attached to an attaching portion disposed in a vehicle cabin comprising:
an interior member main body and
an affixing member for attaching the interior member main body to the attaching portion by insertion thereof into an opening portion formed on the attaching portion,
wherein the affixing member has:
two inserted portions arranged so as to be mutually separated, leading end sides of which are inserted into the opening portion;
a tab portion disposed on at least one of the inserted portions, so as to engage an edge portion of the opening portion when the interior member main body is attached to the attaching portion, thereby preventing the affixing member from falling out of the opening portion; and
a connecting portion connecting the two inserted portions in such a way that a width at a base end side of the affixing member is approximately the same as or greater than a width at the opening portion;
wherein the vehicle interior member is constituted in such a way that when the interior member main body is attached to the attaching portion, the two inserted portions are placed at a spacing such that the tab portion engages the opening portion, and when the two inserted portions are pulled out from the opening portion, a gap at the leading end sides of the two inserted portions is elastically deformed to become narrow, and the engagement between the tab portion and the opening portion is released;
wherein the interior member main body is attached to the attaching portion in such a way that roof trim disposed to cover a vehicle-mounted airbag is disposed between the attaching portion and the interior member main body, and the tab portion extends at an angle from the respective leading end side to a base end side of the inserted portion; a leading end of the tab portion is formed to engage an edge portion of the opening portion, and when a strong force is applied by deployment of an airbag, the tab portion is bent and the interior member main body is displaced toward the base end side, and displacement to the base end side by the roof trim is permitted.

3. An affixing member for attaching an interior member main body to an attaching portion disposed in a vehicle cabin interior, comprising:
- two inserted portions arranged so as to be mutually separated, leading end sides of which are inserted into an opening portion;
- a tab portion disposed on at least one of these inserted portions, such that the inverted portion engages an edge portion of the opening portion when the interior member main body is attached to an attaching portion, thereby preventing the affixing member from falling out of the opening portion;
- a connecting portion connecting the two inserted portions at a base end side of the affixing member in such a way that a width at the base end side of the affixing member is approximately the same as or greater than a width at the opening portion;

wherein the affixing member is constituted in such a way that when the interior member main body is attached to the attaching portion, the two inserted portions are placed at a spacing such that the tab portion engages the opening portions, and when the two inserted portions are pulled out from the opening portion, a gap at the leading end side of the two inserted portions is elastically deformed to become narrow, and engagement between the tab portion and the opening portion is released.

* * * * *